March 10, 1970  K. O. HEVER ET AL  3,499,796
SOLID STATE ENERGY STORAGE DEVICE

Filed Nov. 21, 1966  4 Sheets-Sheet 1

KEITH O. HEVER
JOSEPH T. KUMMER
INVENTORS

BY John R. Faulkner
Olin B. Johnson
ATTORNEYS

March 10, 1970  K. O. HEVER ET AL  3,499,796
SOLID STATE ENERGY STORAGE DEVICE
Filed Nov. 21, 1966  4 Sheets-Sheet 2
FIG. 2
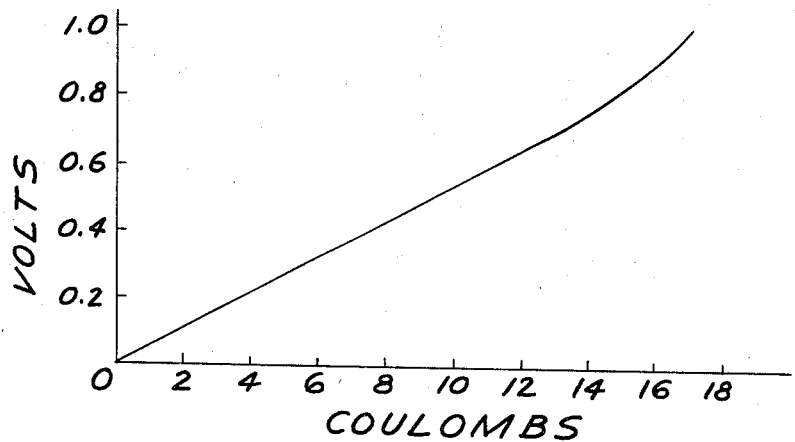
POTENTIAL DISCHARGE VOLTAGE OF DEVICE EXAMPLE 2 RELATIVE TO CHARGE IN COULOMBS AT 300°C
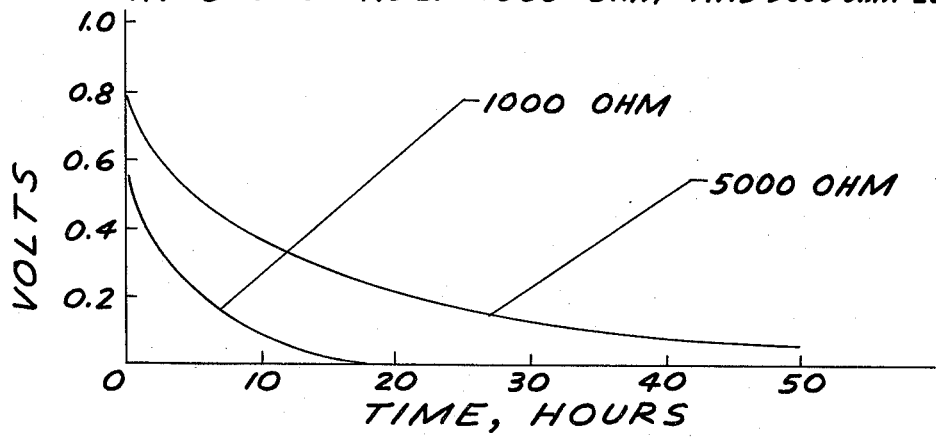
DISCHARGE VOLTAGE OF DEVICE OF EXAMPLE 2 AT 300°C UNDER 1000 OHM AND 5000 OHM LOADS
FIG. 3
KEITH O. HEVER
JOSEPH T. KUMMER
INVENTORS
BY *John R. Faulkner*
*Olin B. Johnson*
ATTORNEYS

FIG. 4
POTENTIAL DISCHARGE VOLTAGE OF DEVICE OF EXAMPLE 3 RELATIVE TO CHARGE IN COULOMBS AT 300°C AND 500°C
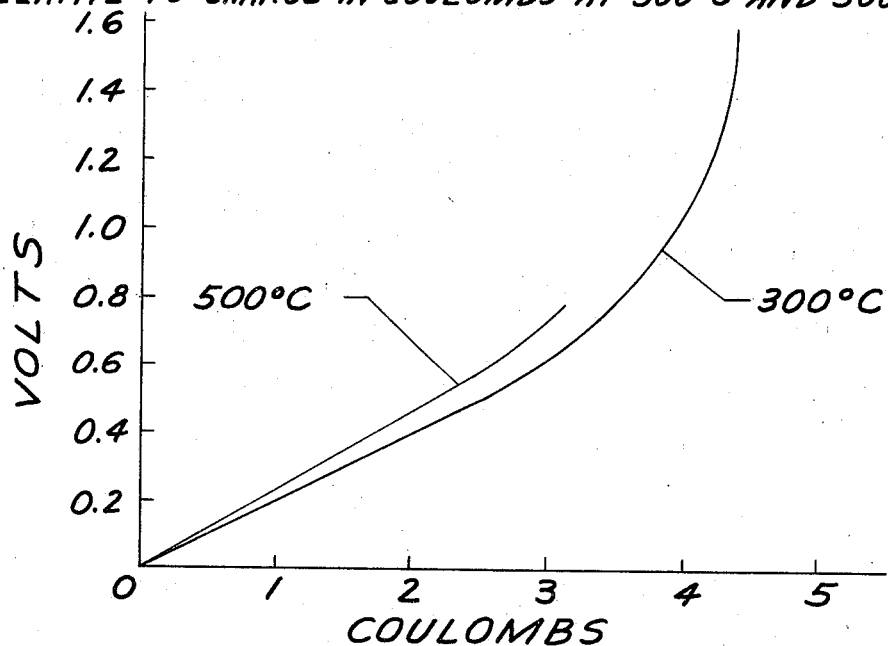
DISCHARGE VOLTAGE OF DEVICE OF EXAMPLE 3 AT 300°C UNDER 1000 OHM AND 5000 OHM LOADS
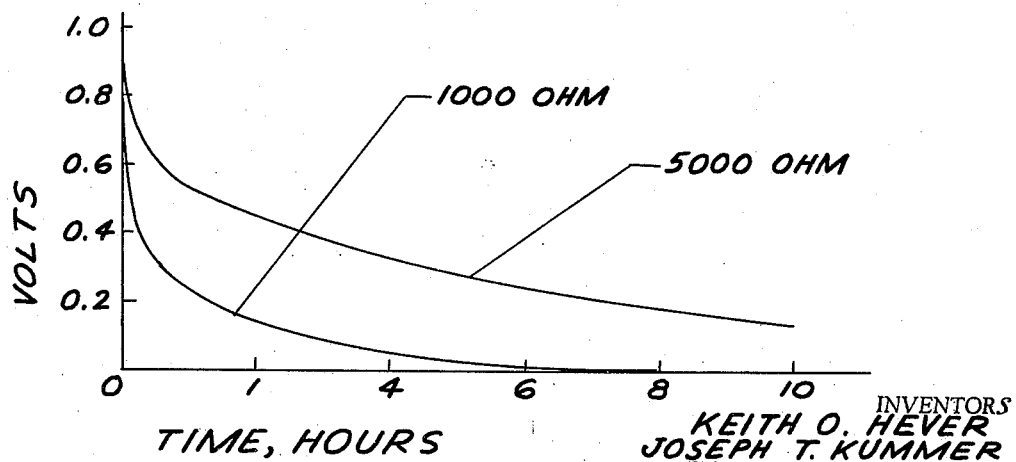
FIG. 5

FIG. 6
DISCHARGE VOLTAGE OF DEVICE OF EXAMPLE 3 AT 500°C UNDER 1000 OHM AND 5000 OHM LOADS
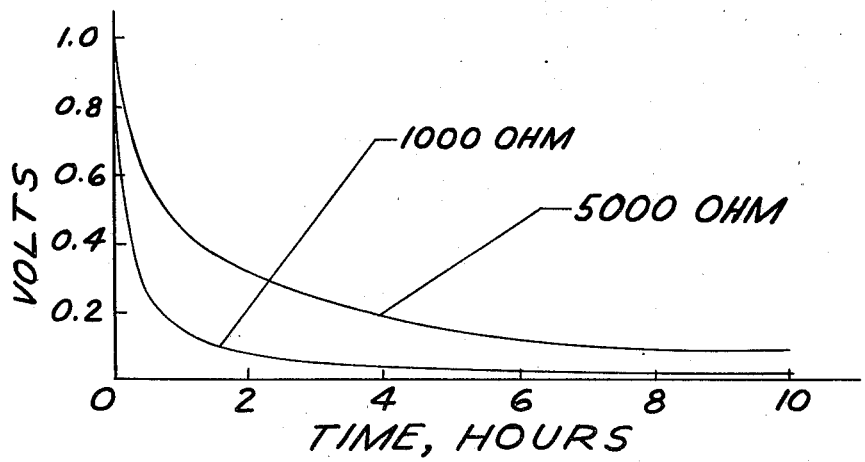
VARIATION OF IMPEDANCE WITH FREQUENCY OF DEVICE OF EXAMPLE 3 AT 500°C
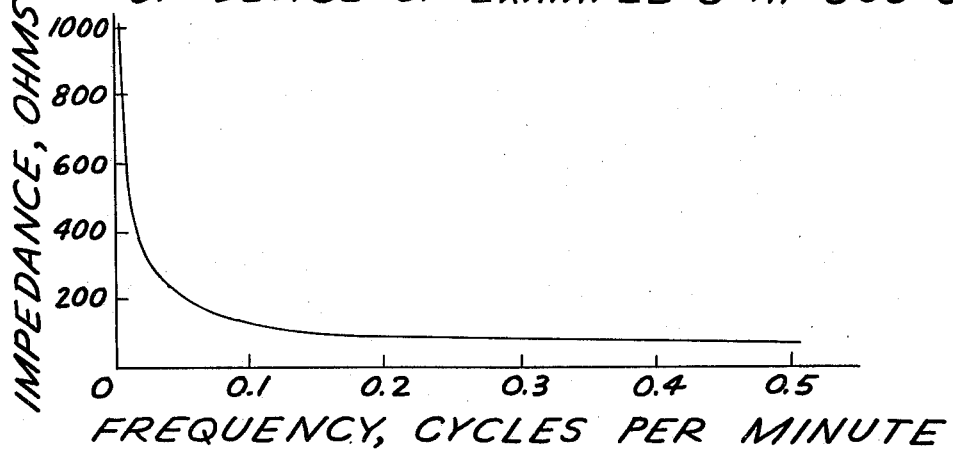
FIG. 7
KEITH O. HEVER
JOSEPH T. KUMMER
INVENTORS
BY John R. Faulkner
Olin B. Johnson
ATTORNEYS United States Patent Office 3,499,796
Patented Mar. 10, 1970

3,499,796
SOLID STATE ENERGY STORAGE DEVICE
Keith O. Hever, Dearborn, and Joseph T. Kummer, Ann Arbor, Mich., assignors to Ford Motor Company, Dearborn, Mich., a corporation of Delaware
Filed Nov. 21, 1966, Ser. No. 595,814
Int. Cl. H01m 21/00, 29/00; H01g 7/00
U.S. Cl. 136—83    11 Claims This invention relates to an energy storage device comprising a ceramic sandwich wherein a pair of electronically- and cationically-conductive crystalline objects are in cation-exchange relationship with and separated by a cationically-conductive, electronically-insulative, crystalline object.

In one embodiment of this invention, the novel energy storage device comprises a capacitor.

In another embodiment of this invention, the novel energy storage device comprises a solid state battery.

The outer members of the ceramic sandwich comprise an electronically-conductive structural lattice and cations which migrate in relation to said lattice under influence of an electric field, said lattice consisting essentially of ions of a metal electrically reversible between two valence states and ions of oxygen in crystal lattice combination. These are exemplified by polycrystalline objects prepared by sintering crystals formed by heating together at crystal-forming temperature oxides of iron and potassium and made electronically conductive by reduction of some of the ferric ions to ferrous ions by doping or other conventional means. The inner member of the ceramic sandwich, hereinafter termed "separator," comprises a structural lattice that is electronically insulating and cations which migrate in relation to sail lattice under influence of an electric field. The separators is exemplified by a polycrystalline object prepared by sintering crystals formed by heating together at crystal-forming temperature oxides of aluminum and potassium. A common cation is employed as the conductive cation in both the outer members and the separator.

As a solid state capacitor, the instant device has many advantages relative to conventional capacitors. It provides a high capacitance per unit volume, i.e. typically of the order of 10 to 30 farads per cubic centimeter or equivalent to permittivity of the order of $10^{14}$. As a consequence of this, the device will also find application in filter circuits and as a D.C. block where the very high values of capacitance involved allow a low impedance at very low frequencies while still providing a very high impedance for direct current, e.g. typically an impedance of about 41 ohms at frequencies equal to or greater than about 0.3 c.p.s. with an impedance of the order of 1 megohm for D.C. or greater. The device can be operated at high temperatures, i.e. at least as high as about 500° C. The capacitance of the device varies with D.C. bias, i.e. the device is non-linear and therefore tunable. The device behaves symmetrically to D.C. bias, i.e. there is no inherent polarity.

On application of a difference of electrical potential across the sandwich, the following processes take place: At the positive electrode alkali metal ions pass into the separator and an equivalent number of electrons are given up to the external circuit. At the negative electrode alkali metal ions enter from the separator and an equivalent number of electrons are accepted from the external circuit.

As a rechargeable solid-state battery, the device has the advantages of durability, small size, long shelf life, and the ability to function in a gravity free environment or under a wide range of operating conditions.

The separator may be a polycrystalline slab or wafer comprising crystals formed from aluminum oxide and sodium oxide. Such materials are described by Joseph T. Kummer and Neill Weber in U.S. patent application Ser. No. 563,938 filed May 2, 1966. The separator may also be a polycrystalline slab or wafer comprising crystals formed from a major component of aluminum oxide and a remainder wherein the major proportion is sodium oxide and the minor proportion consists essentially of the oxide of a metal having a valence not greater than 2, preferably lithium and/or magnesium. The mobile ion, here the sodium ions, can be replaced by other cations, e.g. potassium, lithium, etc. Such substitution is described by Gerald J. Tennenhouse in U.S. patent application Ser. No. 595,702 filed of even date with this application.

This invention will be more easily understood by reading the detailed description of the several exemplified embodiments in conjunction with the accompanying drawings, wherein:

FIGURE 2 is a graph showing the steady state charge-voltage curve for one embodiment of this device at 300° C.;

FIGURE 3 is a graph showing the discharge curves for one embodiment of the device of this invention from a starting voltage of 1 volt under 1,000 ohm and 5,000 ohm loads at 300° C.;

FIGURE 4 is a graph showing the charge-voltage curve for one embodiment of the device of this invention at 300° C. and 500° C.;

FIGURE 5 is a graph showing the discharge curve for one embodiment of this invention from a starting voltage of 1 volt under 1,000 ohm and 5,000 ohm loads at 300° C.;

FIGURE 6 is a graph showing the discharge curve for one embodiment of this invention from a starting voltage of 1 volt under 1,000 ohm and 5,000 ohm loads at 500° C.; and FIGURE 7 is a graph showing the variation of impedance with frequency of one embodiment of this invention.

EXAMPLE 1

Figure 1:
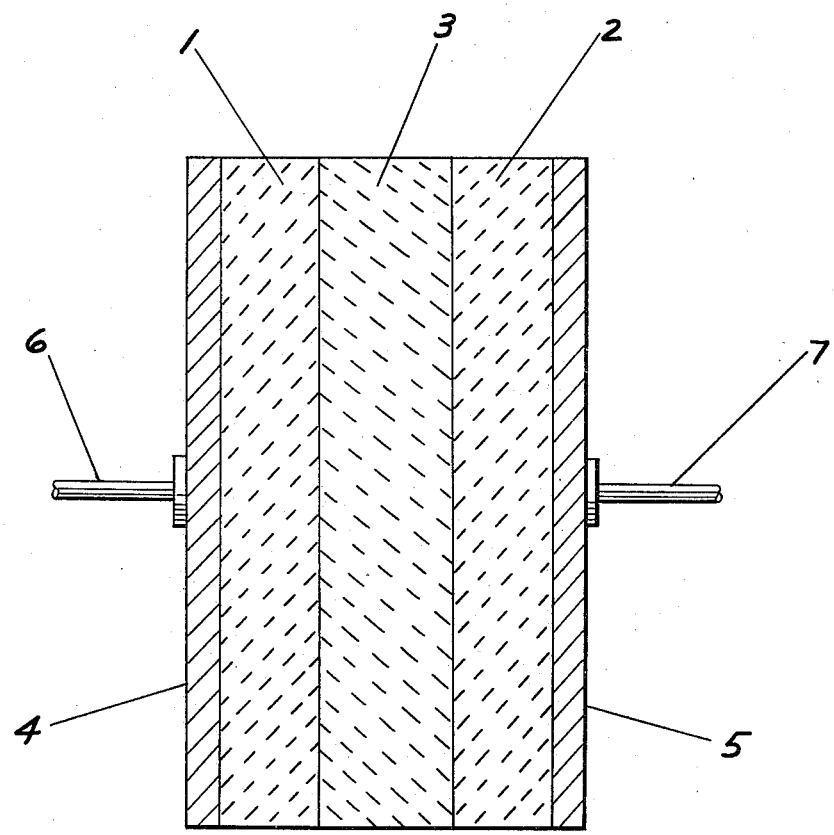
FIGURE 1 is a magnified, schematic, sectional illustration of the device of this invention with attached conductors.

Referring now to FIGURE 1, ceramic wafers 1 and 2 are both electronically and cationically conductive. In this embodiment, each are crystalline, unitary objects formed from iron oxide and potassium oxide and include ions of iron in both the ferrous and ferric states. This mixture of ferrous and ferric ions may be effected by starting with a ferric compound and reducing a portion of the $Fe^{+++}$ ions to $Fe^{++}$ ions by the conventional technique of doping, i.e. the inclusion of a minor amount of foreign cations, or by heating the crystals in a reducing atmosphere. Between ceramic wafers 1 and 2 is a cationically-conductive, electronically-resistive, ceramic wafer 3 and formed from aluminum oxide and potassium oxide. Wafers 1, 2 and 3 are sintered together in cation-exchange relationship. In electrical contact with wafers 1 and 2 are metal conductors 4 and 5 which serve as current collectors or current distributors according to their use as a given time. In electrical contact with conductors 4 and 5 respectively, are conductor leads 6 and 7. Leads 6 and 7 may form a portion of an electrical circuit to which electrical energy is supplied by a power source not shown. In this instance, the ceramic sandwich serves as a capacitor. Leads 6 and 7 may be placed in electrical connection with each other through a resistance means so as to form an electrical circuit with the ceramic sandwich. In this arrangement, the sandwich serves as a one-cell battery.

Preparation and assembly of the device shown in FIGURE 1 are described in detail in several embodiments in the succeeding examples.

EXAMPLE 2

Powders of $Na_2CO_3$, $Fe_2O_3$, $TiO_2$, and $Al_2O_3$ were mixed in relative concentrations to provide a molar composition equal to $Na_2O \cdot 5$ ($Fe_{0.95}$ $Ti_{0.05}Al_2O_3$). This mix- was heated at 1000° C. for one hour. The resultant crystals were mixed with a wax binder and cylindrical discs were isostaticically pressed at about 20,000 p.s.i. These discs measured about 0.5 inch in diameter and had an average weight of about 0.4 gram. Two such discs were placed on opposite sides of a 5/8 inch square plate of fusion cast beta-alumina ($Na_2O \cdot 11Al_2O_3$)-alpha alumina ($Al_2O_3$) eutectic. The resultant sandwich was wrapped in 0.0005 inch thick platinum foil. The sandwich in foil was then heated at 1400° C. for one hour to sinter the discs and plate into a unitary object. The foil was cut away except for those portions covering the outer flat faces of the aforementioned discs. The foil was bonded to these faces during the sintering process.

FIGURE 2 of the drawings shows the steady state charge-voltage curve for this sample device at 300° C.

FIGURE 3 shows the discharge curves from a starting voltage of 1 volt under 1,000 ohm and 5,000 ohm loads at 300° C.

EXAMPLE 3

A device similar to that of Example 2 was prepared by the method of Example 2 with the exception that the members exhibited a molar composition corresponding to $1.3K_2O \cdot 0.2Na_2O \cdot 9.5Fe_2O_3 \cdot TiO_2$ and the separator exhibited a molar composition corresponding to

$$1.3K_2O \cdot 0.2Li_2O \cdot 10Al_2O_3$$

The separator was formed by admixing $K_2CO_3$, $Li_2CO_3$ and $Al_2O_3$ powders, firing such powders at 1000° C. for one hour, admixing the resultant crystals with wax, heating at about 500° C. to remove the binder compressing the waxed crystals at about 20,000 p.s.i. and sintering the compressate at 1960° C. for one-half hour.

FIGURE 4 of the drawings illustrates the charge-voltage curve for this device at 300° C. and 500° C.

FIGURES 5 and 6 illustrate the discharge curves for this device from a starting voltage of 1 volt under 1,000 ohm and 5,000 ohm loads at 300° C. and 500° C.

The behavior of this device upon imposition of alternating current at 500° C. is illustrated in FIGURE 7 which shows the variation of impedance of the cell with frequency. At high frequencies the impedance becomes constant was found to be purely resistive.

EXAMPLE 4

The procedure of Example 2 is repeated with a separator which was prepared in the following manner:

(1) In powdered form $Na_2O$—10.02 wt. percent (introduced as $Na_2CO_3$), $Li_2O$—0.66 wt. percent (introduced as $LiNO_3$) and $Al_2O_3$—89.32 wt. percent were added to a vessel and mechanically mixed for 30 minutes.

(2) The mixture was heated at 1250° C. for one hour to form crystals.

(3) The sample was mixed with a wax binder and mechanically pressed into pellets.

(4) The pellets were then isostatically pressed at 90,000 p.s.i.

(5) The wax binder was removed by gradually heating the pellets to about 550° C.

(6) The pellets were sintered for 16 hours at 1520° C. in an electric furnace in a covered crucible in the presence of packing powder of the same composition as the powders from which the crystals were prepared.

EXAMPLE 5

The procedure of Example 4 is repeated with the outer members of the sandwich formed of crystals prepared as in Example 2. These crystals are mixed with wax, compressed by being isostatically pressed at 90,000 p.s.i. The resulting pellets are gradually heated to about 500° C. to remove the binder and then sintered for 3 hours at 1450° C.

EXAMPLE 6

The separator is prepared in accordance with the procedure of Example 4 and potassium ions are substituted for the sodium ions therein by the following procedure. The sample was placed in a clean platinum crucible. This was placed open on a bed of dry $K_2O \cdot Al_2O_3$ in a larger platinum crucible. The larger crucible was covered and heated at 1380° C. for 64 hours.

EXAMPLE 7

The outer members are prepared as in Example 5 and the separator in accordance with the procedure of Example 4. The cylindrical pellets are immersed overnight in liquid silver nitrate under an argon blanket and the resulting silver ion substituted pellets are then immersed overnight in liquid lithium chloride under an argon blanket to provide lithium ion conductive pellets. The sandwich is then prepared by sintering the outer members to opposite sides of the separator.

EXAMPLE 8

The separator is prepared in accordance with the procedure of Example 4 except that a two component crystalline composition is prepared using 9.91 wt. percent $Na_2O$ and 90.09 wt. percent $Al_2O_3$. The polycrystalline structure is prepared from this material in the same manner as in Example 4.

The pertinent disclosures of all patents and patent applications mentioned herein shall be deemed to be incorporated herein by reference.

It is to be understood that this invention is not limited to the examples herein shown and described, but that changes and modifications may be made without departing from the spirit and scope of the invention, as defined in the appended claims.

What is claimed is:

1. An energy storage device comprising a ceramic sandwich having two end members in carbon-exchange relationship with and separated by a central member, wherein each of said end members is a polycrystalline object consisting essentially of an electronically-conductive structural lattice comprising ions of oxygen and ions of a metal in two valence states and cations which migrate in relation to said lattice, and wherein said central member is a polycrystalline object consisting essentially of an electronically-insulative structural lattice and cations which migrate in relation to said electronically-insulative structural lattice under influence of an electric field, the aforereferred to migratory cations of said end members and of said central member being cations of the same element.

2. An energy storage device in accordance with claim 1 wherein said ions of a metal in two valence states are ferric ions and ferrous ions.

3. An energy storage device in accordance with claim 1 wherein said electronically-insulative structural lattice consists essentially of ions of aluminum and oxygen.

4. An energy storage device in accordance with claim 1 wherein said cations are alkali metal cations.

5. An energy storage device comprising a pair of polycrystalline end members sintered to, separated by and in cation-exchange relationship with a polycrystalline central member, said end members being both electronically-conductive and cationically-conductive and consisting essentially of crystals, said crystals of said end members consisting essentially of a structural lattice and alkali metal cations which migrate in relation thereto under influence of an electric field, said structural lattice including both ferric and ferrous ions in an amount sufficient to render said end members electronically-conductive, said central member consisting essentially of sintered crystals, said crystals of said central member consisting essentially of a crystalline lattice consisting essentially of ions of oxygen and aluminum in crystal lattice combination and alkali metal cations which migrate in relation to said crystalline lattice under influence of an electric field and are cations of the same alkali metal as the alkali metal cations of said end members.

6. An energy storage device in accordance with claim 5 wherein said alkali metal cations are sodium ions.

7. An energy storage device in accordance with claim 5 wherein said alkali metal cations are potassium ions.

8. An energy storage device in accordance with claim 5 wherein said alkali metal cations are lithium ions.

9. An energy storage device in accordance with claim 1 wherein said crystalline lattice consists essentially of a major component of ions of aluminum and oxygen and a minor component of ions of a metal having a valence not greater than 2.

10. An electrical circuit including the energy storage device of claim 5 wherein said energy storage device is a capacitor.

11. An electrical circuit including the energy storage device of claim 5 wherein said energy storage device is an electrically rechargeable battery.

References Cited
UNITED STATES PATENTS

| | | | |
|---|---|---|---|
| 2,718,539 | 9/1955 | Bradshaw | 136—83 |
| 3,117,035 | 1/1964 | Mrgudich | 136—153 |
| 3,170,817 | 2/1965 | Mrgudich | 136—83 XR |
| 3,186,875 | 6/1965 | Freeman | 136—153 |
| 3,281,273 | 10/1966 | Oser | 136—86 |
| 3,300,344 | 1/1967 | Bray et al. | 136—86 |
| 3,377,203 | 4/1968 | Mobius et al. | 136—86 |
| 3,410,728 | 11/1968 | Fullman et al. | 136—86 |

WINSTON A. DOUGLAS, Primary Examiner

A. SKAPARS, Assistant Examiner

U.S. Cl. X.R.

136—86, 153; 317—258